United States Patent

Bahai et al.

[11] Patent Number: 6,097,770
[45] Date of Patent: Aug. 1, 2000

[54] FREQUENCY OFFSET ESTIMATION FOR WIRELESS SYSTEMS BASED ON CHANNEL IMPULSE RESPONSE

[75] Inventors: Ahmad R. S. Bahai, Edison; Mohsen Sarraf, Rumson, both of N.J.

[73] Assignee: Lucent Technologies Inc., Murray Hill, N.J.

[21] Appl. No.: 08/741,992

[22] Filed: Oct. 31, 1996

Related U.S. Application Data

[60] Provisional application No. 60/026,455, Jul. 25, 1996.

[51] Int. Cl.[7] ....................................... H03D 1/00
[52] U.S. Cl. ........................... 375/343; 375/349; 375/350
[58] Field of Search ................... 375/229, 324, 375/343, 346, 350, 354, 355, 362, 365, 371, 349, 144, 143, 149, 195, 152, 339; 370/337, 321, 349, 442; 364/724.01, 724.11, 724.2

[56] References Cited

U.S. PATENT DOCUMENTS

| | | | |
|---|---|---|---|
| 4,630,283 | 12/1986 | Schiff | 375/152 |
| 5,150,380 | 9/1992 | Okanoue | 375/236 |
| 5,173,706 | 12/1992 | Urkowitz | 342/99 |
| 5,228,062 | 7/1993 | Bingham | 375/344 |
| 5,245,611 | 9/1993 | Ling et al. | 370/347 |
| 5,255,290 | 10/1993 | Anvari | 375/344 |
| 5,428,647 | 6/1995 | Rasky et al. | 375/366 |
| 5,432,819 | 7/1995 | Mui | 375/344 |
| 5,438,594 | 8/1995 | Podolak | 375/344 |
| 5,471,501 | 11/1995 | Parr et al. | 375/354 |
| 5,487,186 | 1/1996 | Scarpa | 375/344 |
| 5,491,726 | 2/1996 | Cheng et al. | 375/343 |
| 5,579,338 | 11/1996 | Kojima | 375/149 |
| 5,581,579 | 12/1996 | Lin et al. | 375/331 |
| 5,675,608 | 10/1997 | Kim et al. | 375/145 |
| 5,696,762 | 12/1997 | Natali et al. | 370/320 |
| 5,710,792 | 1/1998 | Fukawa et al. | 375/229 |
| 5,751,776 | 5/1998 | Shiino et al. | 375/371 |

*Primary Examiner*—Fan Tsang
*Assistant Examiner*—Congvan Tran
*Attorney, Agent, or Firm*—J. J. Opalach

[57] ABSTRACT

In a receiver, a received sync-word is fed into two or more filters, where each filter further comprises a matching filter and a sidelobe reduction filter. Each matching filter is matched to a particular subset of k samples of the known sync-word, e.g., k=3, and generates an m-tap estimate, where $m \geq 2$. The output signal of each matching filter is applied to a respective sidelobe filter, which reduces sidelobes resulting from the imperfections of matching the received sync-word in the matching filters. As a result, from each received sync-word, each filter forms a channel impulse response estimate of the communications channel at more than one symbol time. Each channel impulse response estimate comprises the amplitude as well as the phase of the channel impulse response. Since the channel impulse response does not change drastically from one symbol time to one or a few symbol times later, the next channel impulse response estimate comprises the same amplitude information but a different phase information. This difference in phases between the two channel impulse response estimates, aside from noise and other anomalies, is mainly due to the frequency offset. As a result, an estimate of frequency offset is easily derived from this phase difference.

32 Claims, 7 Drawing Sheets

FIG. 1
(PRIOR ART)

| OVERHEAD | DATA/OTHER | SYNC-WORD | DATA/OTHER |
|---|---|---|---|

FIG. 3
(PRIOR ART)

SYNC-WORD 50
(TAKEN FROM AN 8 SYMBOL, OR SIGNAL POINT, CONSTELLATION)

| | | |
|---|---|---|
| $x_0$ | 1.000 | 0.000 |
| $x_1$ | 0.707 | -0.707 |
| $x_2$ | 0.000 | -1.000 |
| $x_3$ | 0.707 | 0.707 |
| $x_4$ | 0.000 | 1.000 |
| $x_5$ | -0.707 | -0.707 |
| $x_6$ | 0.000 | 1.000 |
| $x_7$ | -0.707 | -0.707 |
| $x_8$ | 0.000 | 1.000 |
| $x_9$ | 0.707 | 0.707 |
| $x_{10}$ | -1.000 | 0.000 |
| $x_{11}$ | -0.707 | -0.707 |
| $x_{12}$ | -1.000 | 0.000 |
| $x_{13}$ | -0.707 | 0.707 |

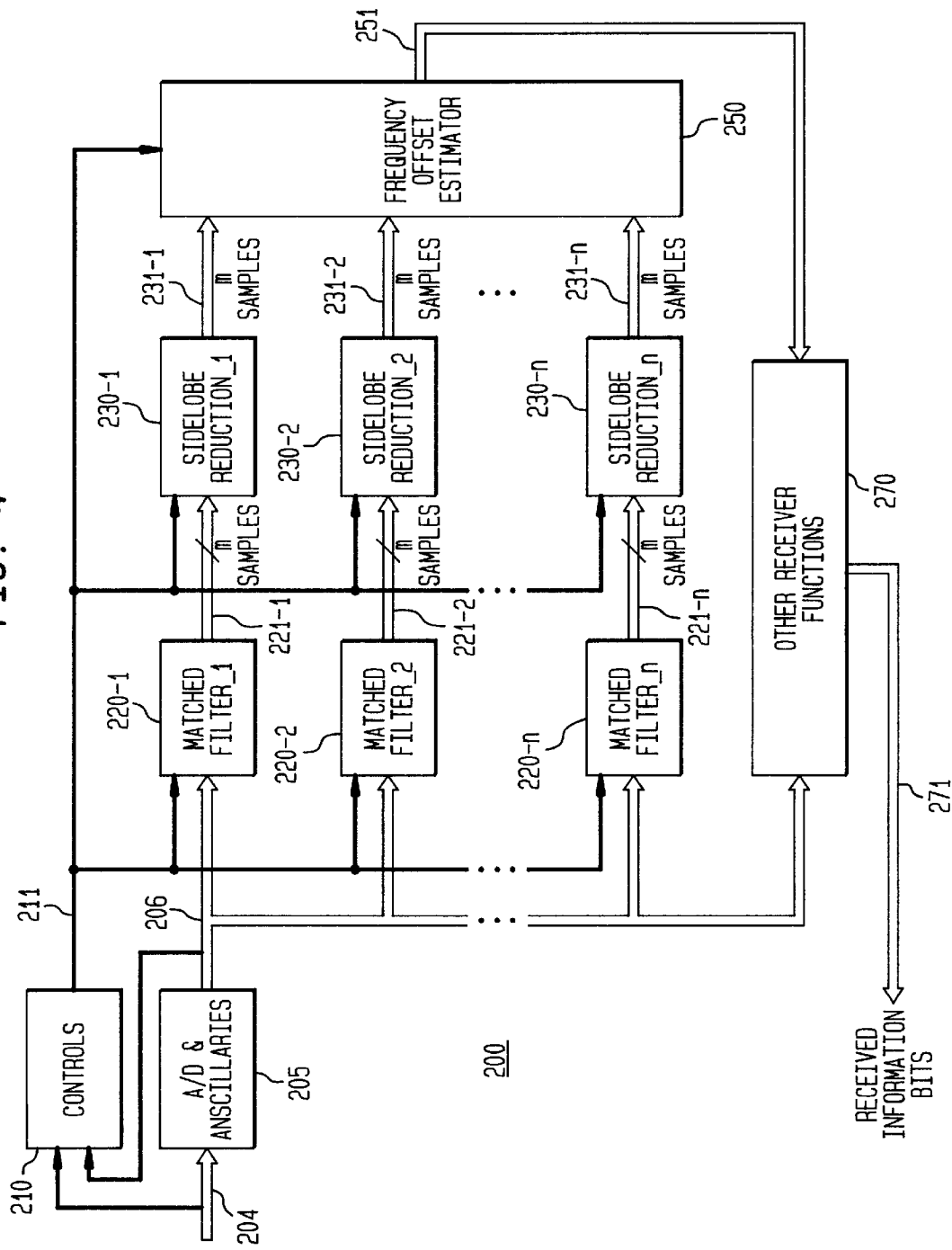

$$(X_2^{i\dagger} X_2^i)^{-1}$$

WHERE, SINCE k = 3, AND m = 2

$$X_2^i = \begin{bmatrix} x(i+1) & x(i) \\ x(i+2) & x(i+1) \\ x(i+3) & x(i+2) \end{bmatrix}, \text{ AND } X_2^{i\dagger} = \begin{bmatrix} x^*(i+1) & x^*(i+1) & x^*(i+1) \\ x^*(i+1) & x^*(i+1) & x^*(i+1) \end{bmatrix}.$$

IN WHICH x(i) IS THE $i^{TH}$ COMPLEX SAMPLE IN THE SYNC-WORD. IN OUR EXAMPLE SINCE i = 0, k = 3 AND m = 2, BASED ON THE SYNC WORDS IN FIG. 3 WE GET $$X_2^0 = \begin{bmatrix} 0.707-j0.707 & 1.0 \\ -j & 0.707-j0.707 \\ 0.707+j0.707 & -j \end{bmatrix}, \text{ AND } X_2^{0\dagger} = \begin{bmatrix} 0.707+j0.707 & j & 0.707-j0.707 \\ 1.0 & 0.707+j0.707 & j \end{bmatrix}, \text{ SO}$$

$$(X_2^{0\dagger} X_2^0)^{-1} = \begin{bmatrix} 0.375 & -0.088-j0.088 \\ -0.088+j0.088 & 0.375 \end{bmatrix}.$$

FIG. 8

$$\Delta f = \frac{n}{2\pi dT} = \frac{\sum_{j=0}^{1} [|\hat{h}_0(j)|^2 \angle (\hat{h}_d(j) - \hat{h}_0(j))]}{\sum_{j=0}^{1} |\hat{h}_0(j)|^2}, \text{ WHERE n IS}$$

THE OVERSAMPLING FACTOR, d IS THE DISTANCE BETWEEN THE TWO PORTIONS OF THE SYNC-WORD CHOSEN FOR TWO SETS OF ESTIMATES IN NUMBER OF SAMPLES, AND T IS THE SYMBOL TIME. ALSO, $\angle$ DENOTES THE ANGLE OF THE OPERAND AND $|.|$ DENOTES THE MAGNITUDE OF THE COMPLEX NUMBER OPERAND. $\hat{h}_0(0)$, AND $\hat{h}_0(1)$ ARE THE TWO CHANNEL IMPULSE RESPONSE ESTIMATE COMPONENTS AT OFFSET ZERO, AND SIMILARLY $\hat{h}_d(0)$, AND $\hat{h}_d(1)$ ARE THE SAME FOR THE ESTIMATES AT OFFSET d.

FREQUENCY OFFSET ESTIMATION FOR WIRELESS SYSTEMS BASED ON CHANNEL IMPULSE RESPONSE

CROSS-REFERENCE TO RELATED PROVISIONAL APPLICATION

This application claims the benefit of the Jul. 25, 1996, filing date of Provisional Application Ser. No. 60/026,455 entitled "Frequency Offset Estimation for Wireless Systems Based on Channel Impulse Response."

BACKGROUND OF THE INVENTION

The present invention relates to communications equipment, and, more particularly, to wireless transmission.

Generally speaking, a communications system comprises a transmitter, a receiver, and a communications channel. The transmitter encodes information for transmission and transmits a signal (the "transmitted signal") over the communications channel to the receiver. Typically, the communications channel distorts the transmitted signal to a degree such that the signal at the receiver (the "received signal") is different from the transmitted signal. As such, one of the functions of the receiver is to process the received signal to mitigate the effects of channel-induced distortion.

One type of channel-induced distortion is known as "frequency offset." While a contributor to frequency offset is any mismatch between the transmitter and receiver local oscillators, or clocks, frequency offset is more apparent in a mobile communications channel because of Doppler effects. The latter are caused by the fact that the transmitter and receiver are not stationary with respect to each other. In the context of a communications system in which the encoded information is transmitted via "transmitted signal points," or "symbols," a frequency offset rotates the symbols in the signal space. As a result, at the receiver, each received signal point is offset from its expected position in the signal space.

One method for compensating for frequency offset in a receiver makes use of the well-known "slicing operation," in which the receiver compares values of each received signal point to the known symbol values and selects the closest symbol as an estimate of the transmitted symbol. For example, consider a mobile communications system in which transmission occurs between a transmitter and a receiver for a relatively long period of time, referred to herein as a "continuous transmission" system. In such a transmission system, it is known in the art to design the receiver to spend some initial time period at the start of reception in which the receiver adapts to any frequency offset. During this initial time period, the receiver assumes that any difference in values between a received signal point and the closest symbol is due to a frequency offset. The receiver then computes an average frequency offset estimate over this initial time period and uses this estimate to rotate the received signal point in the opposite direction. Since the transmission period is long, and there is continuous transmission from the same transmitter (or source) to the same receiver (or destination), this initial time period to acquire the frequency offset estimate incurs negligible overhead.

In contrast, in a "bursty transmission" system the effect of frequency offset on receiver design is more severe. In a bursty transmission system, such as, e.g., a mobile time-division-multiple-access (TDMA) system, transmission between a transmitter and a corresponding receiver occurs in TDMA bursts of relatively short duration. In addition, the receiver is typically receiving, in an interleaved fashion, TDMA bursts from different transmitters, where each TDMA burst suffers from a different amount of frequency offset. As such, the receiver must, somehow, quickly estimate for each TDMA burst the respective frequency offset.

In combating the effect of frequency offset in a TDMA-type bursty transmission system, those in the art have applied an approach similar to the above-mentioned acquisition method used in a continuous transmission system. In particular, each TDMA burst, or frame, uses a predefined "synchronization word" (sync-word) as illustrated in FIG. 1. The receiver compares the received sync-word to the predefined sync-word to generate a single estimate, or sample, of the corresponding frequency offset (described further below).

Unfortunately, in a mobile communications channel reflections of the transmitted signal also occur. As a result, the receiver picks up not only the transmitted signal but additional ghosts of the transmitted signal, or what is referred to as "delay spread." Although the above-mentioned approaches are useful in combating the effects of frequency offset by itself, they are limited in their ability to effectively estimate frequency offset in the presence of significant delay spread.

SUMMARY OF THE INVENTION

We have realized a technique for estimating frequency offset in the presence of significant delay spread. In particular, and in accordance with the inventive concept, a frequency offset estimate is formed from a plurality of m-tap estimates, or samples, of a received signal, where $m \geq 2$.

In a receiver embodying the inventive concept, a received sync-word is fed into two filters, where each filter further comprises a matching filter and a sidelobe reduction filter. Each matching filter is matched to a particular subset of k samples of the known sync-word, e.g., k=3, and generates an m-tap estimate, where, e.g., m=2. The output signal of each matching filter is applied to a respective sidelobe filter, which reduces sidelobes resulting from the imperfections which are inherent in the transmitted sync-word. As a result, from each received sync-word, each filter forms a channel impulse response estimate of the communications channel at more than one symbol time. Each channel impulse response estimate comprises the amplitude as well as the phase of the channel impulse response. Since the channel impulse response does not change drastically from one symbol time to one or a few symbol times later, the next channel impulse response estimate comprises the same amplitude information but a different phase information. This difference in phases between the two channel impulse response estimates, aside from noise and other anomalies, is mainly due to the frequency offset. As a result, an estimate of frequency offset is easily derived from this phase difference.

BRIEF DESCRIPTION OF THE DRAWING

FIG. 1 is an illustrative diagram of a prior art TDMA frame format that includes a synchronization word;

FIG. 3 is an illustrative predefined sync-word;

FIG. 4 is an illustrative block diagram of a portion of a receiver in accordance with the principles of the invention;

FIG. 6 illustrates equations for use in design of a sidelobe suppression filter;

FIG. 8 illustrates an equation for use in design of a frequency offset estimator 250.

DETAILED DESCRIPTION

Figure 2:
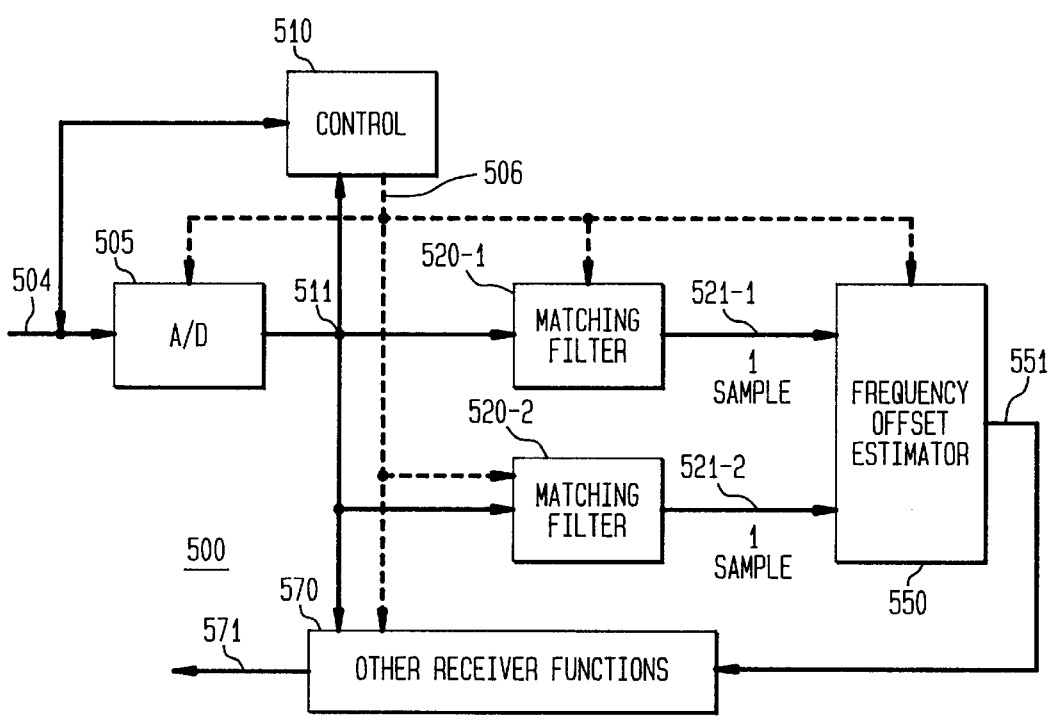
FIG. 2 is an illustrative block diagram of a portion of a prior art receiver for use in generating a frequency offset estimate.

Before describing the inventive concept, reference should be made to FIG. 2, which shows an illustrative prior art approach to estimating frequency offset. It is assumed receiver 500 is part of a TDMA mobile communications systems that conforms to industry standard TIA IS-136 as known in the art and the received signal represents a stream of TDMA frames. Each TDMA frame comprises a plurality of bursts, or slots. An illustrative format of a TDMA burst is illustrated in FIG. 1. As noted earlier, each TDMA burst includes a sync-word that is used for, among other things, to compensate for frequency offset. (It should be noted that TIA IS-136 defines a set of sync-words from which one is selected during negotiation of a particular TDMA connection. For the purposes of describing the inventive concept, only one sync-word is shown).

Although not described in detail herein, receiver 500 includes circuitry (not shown), e.g., a demodulator, hilbert filter, etc., for recovering from the received signal a low-frequency, or baseband, form of the received signal for application to analog-to-digital (A/D) converter 505. The latter samples this signal at, e.g., twice the symbol rate of 1/T, and converts this signal into the digital domain in the form of digital samples 511. It should be realized that the latter represent both in-phase and quadrature components as known in the art. This stream of digital samples is applied to matching filters 520-1 and 520-2, which, as known in the art, correlate a portion of the received sync-word with a respective portion of the predefined sync-word. Control system 510, via controls 506, routes the proper samples to each of the two aforementioned filters, e.g., enables the appropriate filter at the appropriate time. An illustrative predefined sync-word 50 is shown in FIG. 3, which shows illustrative in-phase and quadrature coordinates for 14 symbols, $x_0$ through $X_{13}$. Each symbol is taken from a signal space constellation (not shown) that is known a priori to both the transmitter and receiver as defined in TIA IS-136. Continuing with this example, matching filter 520-1 compares the first three symbols of the received sync-word to the first three symbols of the predefined sync-word, while matching filter 520-2 compares the last three symbols of the received sync word to the last three symbols of the predefined sync-word. Each matching filter 520-1 and 520-2 provides an output signal 521-1 and 521-2, respectively. The latter is a pair of samples, i.e., a complex number representative of the amount of correlation of the respective portions of the received sync-word with the respective portions of the predefined sync-word. Each of these output signals 521-1 and 521-2 are also known as single tap estimates. As known in the art, frequency offset estimator 550 compares the two phases of output signals 521-1 and 521-2 to generate an estimate of frequency offset 551, which is applied to element 570. The latter uses this estimate of frequency offset 551 to compensate for frequency offset by, e.g., rotating the received symbols in the opposite direction. Element 570 represents other receiver functions for recovering information signal 571, e.g., a slicer, Viterbi decoder, etc.

There are other prior art techniques for recovering a frequency offset estimate. For example, the receiver can perform comparisons to the entire pre-defined sync-word and different rotated versions of the sync-word. In this case, the receiver comprises a number of matching filters, one matching filter comparing the received sync-word to the entire predefined sync-word and the remaining matching filters comparing the received sync-word to each of the predefined rotated versions of the sync-word. The matching filter that shows the highest degree of correlation with the received sync-word identifies the approximate amount of frequency offset in the received signal.

Turning now to the inventive concept, reference should be made to FIG. 4, which is an illustrative high-level block diagram of a portion of a receiver 200 embodying the principles of the invention. Again, it is assumed that receiver 200 is part of a TDMA mobile communications systems that conforms to industry standard TIA IS-136 as known in the art and the received signal represents a stream of TDMA frames. Each TDMA frame comprises a plurality of bursts, or slots. An illustrative format of a TDMA burst is illustrated in FIG. 1. As noted earlier, each TDMA burst includes a sync-word that is used for, among other things, to compensate for frequency offset. (It should be noted that TIA IS-136 defines a set of sync-words from which one is selected during negotiation of a particular TDMA connection. For the purposes of describing the inventive concept, only one sync-word is shown).

Although not described in detail herein, receiver 200 includes circuitry (not shown), e.g., a demodulator, hilbert filter, etc., for recovering from the received signal a low-frequency, or baseband, form of the received signal for application to analog-to-digital (A/D) converter 205. The latter samples this signal at, e.g., twice the symbol rate of 1/T, and converts this signal into the digital domain in the form of digital samples 206. It should be realized that the latter represent both in-phase and quadrature components as known in the art.

This stream of digital samples is applied to matching filters 220-1 and 220-n. Control system 210 routes the proper samples to each of these aforementioned filters, e.g., enables the appropriate filter at the appropriate time. An illustrative predefined sync-word 50 is shown in FIG. 3. Although FIG. 4 illustrates the inventive concept in the context of using a set of n filters, in the description that follows, it will be assumed that n=2. As such, the description will only focus on filters 220-1 and 220-2. Extension of the inventive concept to other integral values of n is straight forward and will not be described.

Each output signal of the possible output signals of the matching filter is matched to a particular subset of k of the symbols of the predefined sync-word, also referred to herein as a k-symbol subset. In this example, it is assumed that k=3, and m=2. (As noted above, industry standard TIA IS-136 defines a plurality of sync-words for use on different TDMA connections.) In this example, the sync-word shown in FIG. 3 is assumed to be valid for this illustrative TDMA burst. As such, the first two 3-symbol subsets comprise the following symbol positions: 0, 1, 2, and 1, 2, 3; and the second two 3-symbol subsets are 10, 11, 12, and 11, 12, 13. When other sync-words are used, the k-symbol subsets of the sync-word may change. Although any k-symbol subsets may be used, preferably, selection of the k-symbol subsets are determined experimentally and is a function of the sync-word pattern, desired accuracy of the filtering process (e.g., fine or coarse), and receiver complexity constraints. Since the k-symbol subsets are predefined, controller 510 determines the proper k-symbol subset to use in each matching filter as a function of the negotiated sync-word.

Referring briefly back to FIG. 2, each matching filter of prior art receiver 500 generates only one complex number, i.e., a single tap estimate, as a basis for estimating frequency offset. However, we have realized that the use of a single tap estimate is not effective in the presence of reflections or ghosts. That is, delay spread in the received signal negatively effects the performance of prior art frequency offset estimation techniques which use a single tap estimate. Generally speaking, in delay spread, signal peaks are smeared due to reflections, and multiple signal peaks exist. As such, use of a single tap estimate as a basis for estimating frequency offset does not yield a reliable estimate in the presence of significant delay spread. Therefore, and in accordance with the inventive concept, the channel impulse response is estimated at more than one sample time. That is, each channel impulse response estimate is m samples long ($m \geq 2$), customarily known as an m-tap estimate of the channel. As known in the art, m-tap estimates are routinely calculated to determine overall channel impulse response but have never been used as a basis for estimating frequency offset.

Figure 5:
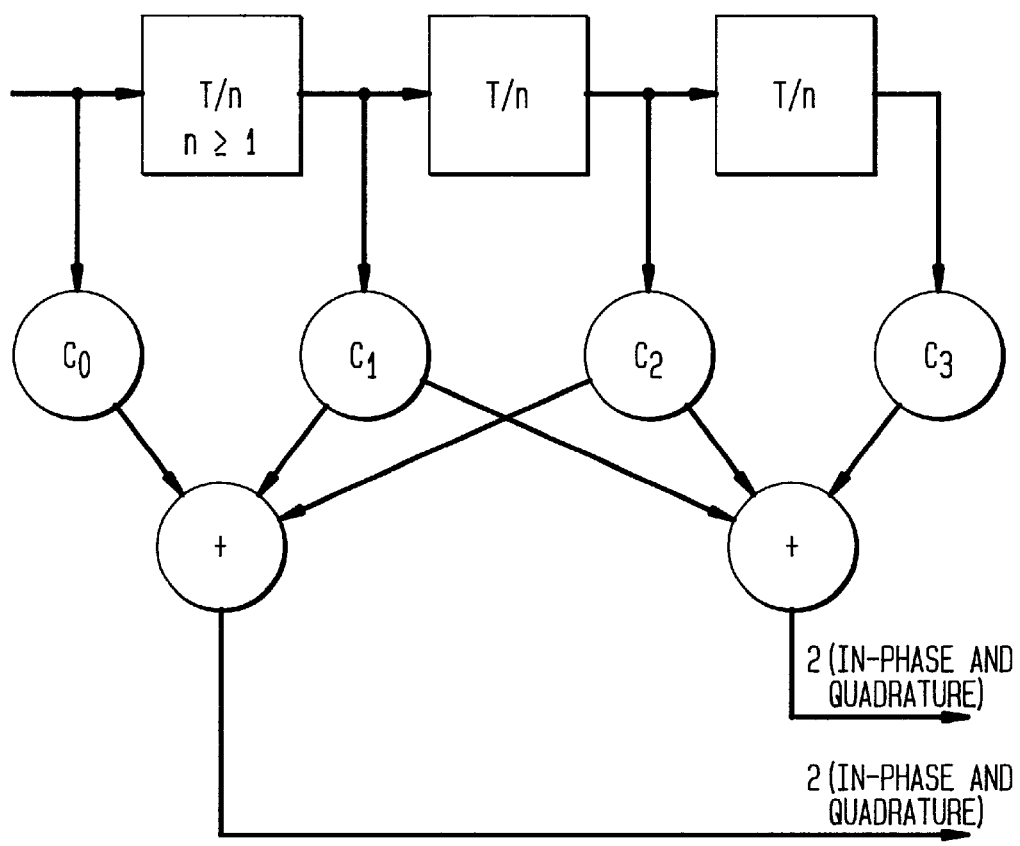
FIG. 5 is a block diagram of a portion of an finite impulse response filter providing an m-tap estimate.

In this example, as noted above, filter 220-1 is matched to the first three symbols, while filter 220-2 is matched to the last three symbols and m=2. However, the value of m can be adjusted as a function of how finely one would like to estimate the frequency offset. For example, for a fine estimate, several samples of the channel impulse response may be formed at fractional symbol times, while for a coarser estimate, one or two samples at one or two symbol times, respectively. In this example, the latter approach is described and each of these matched filters generate a two tap estimate. An illustrative portion of an finite impulse response (FIR) filter is shown in FIG. 5 for generating a two tap estimate. The structure of an FIR filter is well-known and will not be described. The values of the set of coefficients $c_i (0 \leq i \leq 3)$ are a function of the corresponding 3-symbol subset.

Each tap estimate comprises two values representing a complex number. Since the channel does not change drastically from one symbol time to one or a few symbol times later, the next tap estimate will also contain the same amplitude information but a different phase information for the channel impulse response.

The output samples from each matching filter are applied to a corresponding sidelobe reduction filter. As used herein, the term "filter bank" refers to a matching filter and the corresponding sidelobe reduction filter. Each sidelobe reduction filter reduces the sidelobes resulting from the imperfections of the sync-word in the matching filters and thereby provides better channel estimates. The sidelobe reduction transfer functions are dependent upon the k-symbol subset as illustrated by the equations in FIG. 6. Equation (A) is a general equation in matrix form of the transfer equation of each sidelobe reduction filter. The remaining equations are illustrations of the matrix form of $X^k_m$ for the illustrative values of k=3 and m=2. The two columns correspond to m=2, and the three rows correspond to k=3.

It should be noted that adding a sidelobe filter is not optimum in terms of noise performance since the sidelobe filter enhances noise. As such, as shown in FIG. 4, the sidelobe filter is not used in the information bit recovery path of the receiver. However, as far as channel estimation is concerned, we have experimentally determined that the use of a sidelobe filter gives better results and is computationally equivalent to the original matching filter.

The output signal of each filter bank is a sidelobe-reduced m tap estimate of the channel at a different time instance. This set of output signals 231-1 to 231-n is fed to frequency offset estimator circuit 250, which finds the amount of phase rotation from one estimate to the other and averages them to arrive at a final estimate of the phase rotation which in turn corresponds to an estimate of the frequency offset in the system.

Figure 7:
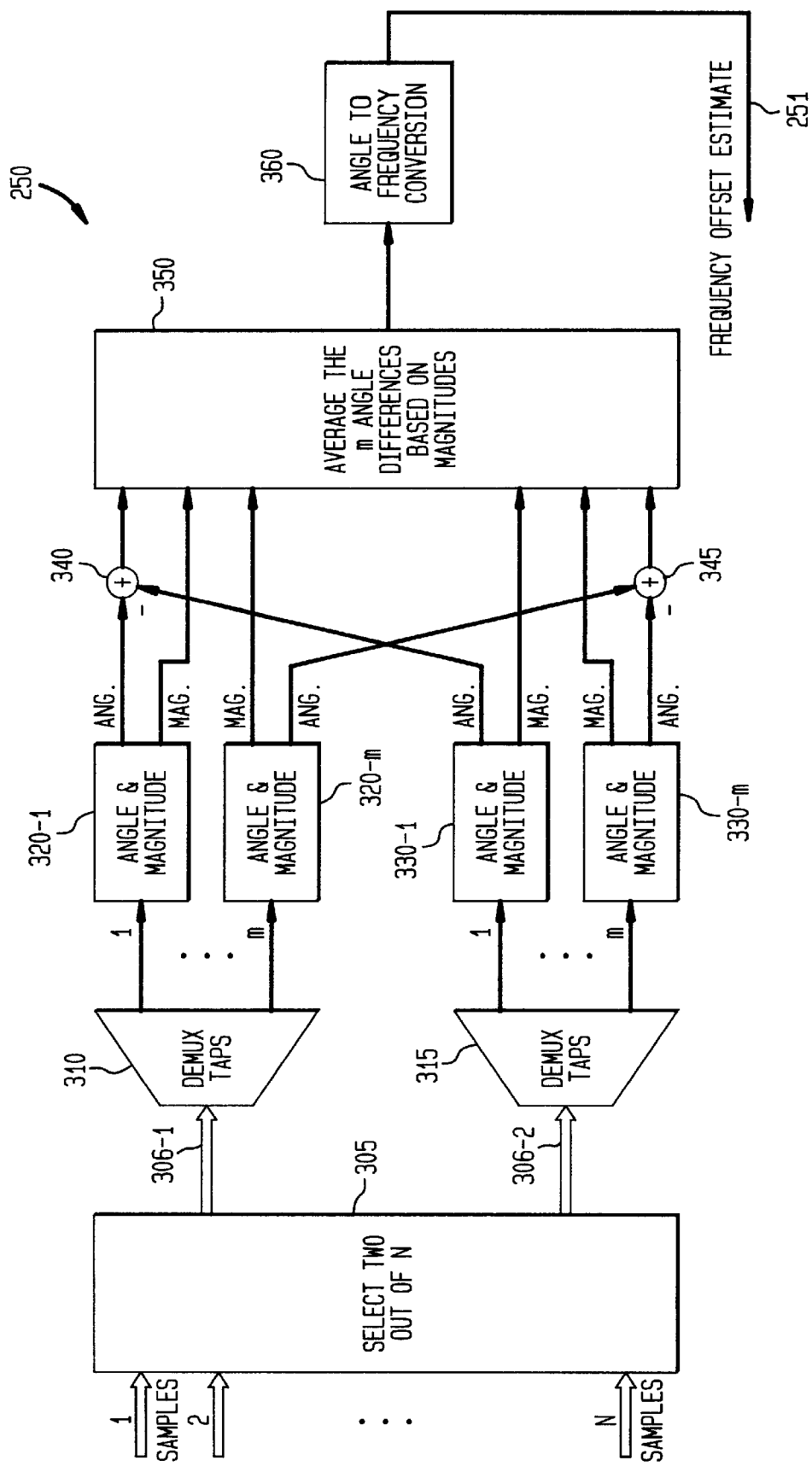
FIG. 7 is a block diagram of element 250 of FIG. 4.

An illustrative block diagram of frequency offset estimator 250 is shown in FIG. 7. The set of output signals 231-1 to 231-n is applied to two-out-of-N selector 305, which selects two of the best instances for channel estimation, e.g., based upon magnitude of the applied estimates. Obviously, two-out-of-N selector 305 is shown for completeness in the context of using n filter banks and is not needed in the context of this description, where n=2. (Also, in the context of n filter banks, more than two channel estimates can be chosen, i.e., a j-out-of-N selector may be used where $2 \leq j \leq N$. However, this comes at the cost of more processing time for the gain of more averaging power since the different frequency offsets can be averaged to yield a better estimate.)

In any event, signals 306-1 and 306-2, which in this example correspond to signals 231-1 and 231-2, respectively, are applied to demultiplexing circuitry 310 and 315. Each of the latter simply routes the signal representing the respective m tap channel estimates to respective elements for calculation of angle and magnitude. Since each tap estimate is a complex number, the angle and magnitude for each tap estimate is determined by elements 320-1 to 320-m and 330-1 to 330-m. (Again, in this specific example, m=2).

As shown in FIG. 7, adder 340 determines the phase difference between the first tap estimates of the two k-symbol subsets. Similarly, adder 345 determines the phase difference between the second tap estimates of the two k-symbol subsets. (In the more general case of a channel estimate comprising m-tap estimates, phase differences are determined between respective tap estimates of a channel estimate. For example, if m=3, then an additional adder would be used in element 250 to generate a phase difference between the respective second tap estimates.) The output signals of adders 340 and 345, along with the magnitudes of each tap estimate are applied to elements 350 and 360, which average the m phase differences based on magnitudes as illustrated in the equation shown in FIG. 8.

As illustrated in this equation, the angle difference of each tap estimate are weighted by the magnitudes to arrive at a weighted angle difference. Since by definition, the time elapsed between the two k-symbol tap estimates is known, e.g., from the carrier frequency, the weighted angle difference is readily converted to a frequency offset by element 360 as represented by $n/(2\pi i T)$, where $n \geq 1$ denotes the number of samples per symbol.

In the absence of frequency offset the angle difference should be zero. Conversely, the larger the absolute value of this angle difference, the larger the frequency offset. It should be noted that in this approach most of the computations are based on symbols that are already known, thus the corresponding computations can be done off line, resulting in minimal overhead in real time processing which is very desirable.

This frequency offset estimate 251 is applied to element 270. The latter uses this estimate of frequency offset 251 to compensate for frequency offset by, e.g., rotating the received symbols in the opposite direction. Element 270 represents other receiver functions for recovering information signal 271, e.g., a slicer, Viterbi decoder, etc.

As described above, an estimate of the channel impulse response is formed at two symbol times. Each channel estimate contains in itself the amplitude as well as the phase of the channel impulse response. Since the channel does not change drastically from one symbol time to one or a few symbol times later, the next channel estimate will contain the same amplitude information but a different phase information for the channel impulse response. This difference in phases between the two channel estimates, aside from noise and other anomalies, is mainly due to the frequency offset. In other words, by having at least two estimates of the channel impulse response we can get the phase difference between the two estimates, from which the estimate of the frequency offset is easily derived.

Although not needed for the inventive concept, for completeness the following is a more detailed presentation of the model and analysis. To avoid confusion, it should be noted that in the following analysis some parameters are re-defined. For example, m, as described below is an integer and does not represent the number of tap estimates as used above.

1. The Model and Analysis

We model the system by taking complex (to represent both the in-phase and the quadrate-phase) T/m samples, where T is the symbol period, so we have m complex m samples per transmitted symbol. Let the channel be sufficiently represented by l such samples, so the vector $\vec{H}=(h(0), h(1), \ldots h(l-1))^t$, represents the complex channel impulse response. The known transmitted symbols (i.e., the samples corresponding to the SYNC-word) at sample times can be similarly represented by $\vec{X}=(x(0), x(1), x(N-1)$, where we assume that the sequence of x(i), for $0 \leq i < N$, is a known pattern and the transmitted samples x(i), for i<0, or $i \geq N$, are unknown data samples. At the receiver we have the transmitted samples convolved with the channel impulse response plus additive noise. In order to estimate the channel impulse response we have to excite it with known samples, and since the channel impulse response is l samples long we will concentrate our observation at the receiver to the received samples corresponding to x(l-1) to x(N-1) of the known transmitted pattern. To arrive at our estimate we can take as many received contiguous samples beyond the one corresponding to x(l-1) but not beyond the received sample corresponding to x(N-1) since transmitted samples beyond that point are random and not known to us, resulting in different accuracies. Without loss of generality let us take M, $1 \leq M \leq N-1$, received samples corresponding to x(k) where $l-1 \leq k \leq N-M-1$, namely r(k), to x(k+M-1), namely r(k+M-1).

At the receiver the received vector $\vec{R}_M^k=(r(k), r(k+1), \ldots, r(k+M-1))^t$, is $$\vec{R}_M^k = \Psi_0 X_M^k \vec{H} + \vec{W} \tag{1}$$

where $\vec{W}=(w(0), w(1), \ldots, w(M-1))^t$, is the vector of M independent samples of AWGN of power $N_0$, $$X_M^k = \begin{bmatrix} x(k) & x(k-1) & \ldots x(k-l+1) \\ x(k+1) & x(k) & \ldots x(k-l+2) \\ \cdot & \cdot & \ldots \\ \cdot & \cdot & \ldots \\ \cdot & \cdot & \ldots \\ x(k+M-l) & x(k+M-2) & \ldots x(k+M-l) \end{bmatrix}$$

in which all elements are known and complex, and $$\Psi_0 = \begin{bmatrix} 1 & 0 & \ldots 0 \\ 0 & e^{j\frac{2\pi\Delta fT}{m}} & \ldots 0 \\ \cdot & \cdot & \ldots \\ \cdot & \cdot & \ldots \\ \cdot & \cdot & \ldots \\ 0 & 0 & \ldots e^{j\frac{2\pi(M-1)\Delta fT}{m}} \end{bmatrix}$$

which accounts for the unknown frequency offset $\Delta f$ introduced at the receiver. Note again that we are assuming that the channel does not change during the transmission of the N-1 known samples, so that $\vec{H}$ does not change, however, is unknown, and the only change in channel characteristics is due to $\Psi$, namely from the frequency offset.

Now let us take another set of M contiguous samples at the receiver corresponding to transmitted known samples x(k+i) to x(k+i+M-1), where k=i=M<N, resulting in the received vector $\vec{R}_M^{k+i}=(r(k+i), r(k+i+1), \ldots, r(k+i+M-1))^t$, which similar to (1) is $$\vec{R}_M^k = \Psi_i X_M^{k+i} \vec{H} + \vec{W} \tag{2}$$

where, $$X_M^{k+i} = \begin{bmatrix} x(k+i) & x(k-1+i) & \ldots x(k-l+1+i) \\ x(k+1+i) & x(k+1) & \ldots x(k-l+2+i) \\ \cdot & \cdot & \ldots \\ \cdot & \cdot & \ldots \\ \cdot & \cdot & \ldots \\ x(k+M-l+i) & x(k+M-2+i) & \ldots x(k+M-l+i) \end{bmatrix}$$

in which, as in $\vec{X}_M^k$, all elements are complex and known, also $$\Psi_i = e^{j\frac{2\pi i \Delta fT}{m}} \Psi_0,$$

simply because the sample elements in $\vec{X}_M^{k+i}$ suffer i times more frequency offset rotation by the time they get to the receiver than the ones in $\vec{X}_M^k$.

Now, note that in (1) both $\vec{H}$, and $\Psi_0$ are unknown and must be estimated. This cannot be easily done unless $\Psi_0$ can be approximated by an M×M identity matrix, in other words, we assume that the rotation of samples due to frequency offset at the receiver is negligible over M contiguous samples, which is a reasonable assumption to make in practice, as simulation results also show, specially when M is very small. Because of this reason we will choose M to be relatively small in practice and in the case of M=1, this point is moot. Under this assumption, (1) reduces to $$\vec{R}_M^k = X_M^k \vec{H} + \vec{W} \tag{3}$$

and (2) reduces to $$\vec{R}_M^{k+i} = X_M^{k+i} \vec{H} e^{j\frac{2\pi i \Delta f t}{m}} + \vec{W} \qquad (4)$$

From (3) we can get an estimate of $\vec{H}$ with offset k, namely $\hat{H}_k$ by $$\hat{H}_k = \left[ \left( X_M^{k\dagger} X_M^k \right)^{-1} X_M^{k\dagger} \right] \vec{R}_M^k \qquad (5)$$

where † denotes the Hermitaian transpose of a matrix. Note that in (5) the terms in the bracket are known a priori and can be calculated off-line and stored in the receiver. It can be implemented as cascades of two FIR filters operating on the received samples. Substituting (3) in (5) we get $$\hat{H}_k = \left[ \left( X_M^{k\dagger} X_M^k \right)^{-1} X_M^{k\dagger} \right] \vec{W} \qquad (6)$$

Taking the expected value of both sides of (6) we see that $E\{\vec{H}_k\} = \vec{H}$, which shows that (5) is an unbiased estimate. Also note from (6) that the AWGN has been colored by this linear process and we can suffer from noise enhancement. The amount of noise enhancement clearly depends on the term in the bracket on the right hand side of (6), and can be detrimental in cases where $X_M^{k\dagger} X_M^k$ is singular. However, since all the elements in the bracket are known a priori we can choose the offset k and k+i in such a way that they will result in the least amount of noise enhancements among all offset choices possible.

From (6) we see that $\hat{H}$ is Gaussian random process, since it is a linear combination of a nonrandom, even though unknown, process $\vec{H}$, and a linear operation on a zero mean Guassian random process $\vec{W}$. So, $\hat{H}$ is a Guassian random process with mean $\vec{H}$ and covariance matrix $$E\left\{ (\hat{H} - \vec{H})^2 \right\} =$$

$$E\left\{ \left( \left[ \left( X_M^{k\dagger} X_M^k \right)^{-1} X_M^{k\dagger} \right] \vec{W} \right) \left( \left[ \left( X_M^{k\dagger} X_M^k \right)^{-1} X_M^{k\dagger} \right] \vec{W} \right)^\dagger \right\} = N_0 \left( X_M^{k\dagger} X_M^k \right)^{-1}.$$

The signal to noise ration at the output of the estimator, $SNR_e$, is $$SNR_e = \frac{\|\vec{H}\|}{N_0 \left\| \left( X_M^{k\dagger} X_M^k \right)^{-1} \right\|} \qquad (7)$$

where $\|.\|$ denotes the $l_2$ norm of a vector in the numerator and of a matrix in the denominator.

It can be easily shown that, except in some peculiar circumstances, often the higher M is the higher $SNR_e$ will be. But recall from previous arguments that the higher M is the less realistic our approximation of $\Psi_0$ to an M×M identity matrix will be. So, there is an optimum M for a given circumstance.

Similar to the estimate in (5) derived from (3), we can get an estimate of $$\vec{H} e^{j\frac{2\pi i \Delta f T}{m}},$$

or equivalently $\hat{H}_{k+i}$, from (4) to be $$\hat{H}_{k+i} = \hat{H} e^{j\frac{2\pi i \Delta f T}{m}} = \left[ \left( X_M^{(k+i)\dagger} X_M^{(k+i)} \right)^{-1} X_M^{(k+i)\dagger} \right] \vec{R}_M^{k+i} \qquad (8)$$

This is the exact same set up as in (5) and can be realized similarly.

Now (5) and (8) give two estimates of the channel impulse response i samples away from each other, thus besides the effect of noise, the two estimates differ only in phase which directly corresponds to the amount of frequency offset, as is obvious from (5) and (8). So, it can be easily seen from (5) and (8) that each element of the channel vector is going to give an estimate of the frequency offset. These estimates, there are l of them, can be weighted by the magnitude of their corresponding element and then averaged to give a final estimate. The estimate of the frequency offset then, is $$\Delta f = \frac{m}{2\pi i T} \sum_{j=0}^{l-1} \frac{\left[ |\hat{h}_k(j)|^2 * \angle(\hat{h}_{k+i}(j) - \hat{h}_k(j)) \right]}{\sum_{j=0}^{l-1} |\hat{h}_k(j)|^2} \qquad (9)$$

in which $\angle$ denotes the angle or phase of the operand, and $\hat{h}_k(j)$ is the $j^{th}$ element of the vector $\hat{H}_k$.

Note that if we have the choice of the transmitted symbols we can choose a SYNC-word smart enough to give us less noise enhancement so the penalty we pay due to noise enhancement is minimized. However, in cases where we have no such control, such as cases in which SYNC-words are dictated by standards, our task mainly gets concentrated on which offsets k and k+i to choose and what M should be. The choice of l is usually dictated to us by the resolution of the estimate we like and the characteristics of the channel we transmit over. For example in the mobile environment of IS-136 standard it is assumed that delay spreads of more than one symbol time do not occur frequently enough to be considerable. This is the situation we have considered in our simulation and lab results.

2. Design Guidelines

In this section we discuss some of the performance issues, and based on them give design guidelines for choosing the known SYNC-word pattern if the option exists, and guidelines for finding a suitable M. As shown in (7) the signal to noise ratio at the output of the estimator is $SNR_e$ $$SNR_e = \frac{\|\vec{H}\|}{N_0 \left\| \left( X_M^{k\dagger} X_M^k \right)^{-1} \right\|},$$

but from theorems on norms of matrices we get $$SNR_e = \frac{\|\vec{H}\|}{N_0 \left\| \left( X_M^{k\dagger} X_M^k \right)^{-1} \right\|} \leq \frac{\|\vec{H}\|}{N_0} \left\| X_M^{k\dagger} X_M^k \right\|$$

So, the higher the norm of the matrix $X_M^{k\dagger} X_M^k$ is the higher the signal to noise ratio may be. But by expansion of both sides it is easy to show that $$X_M^{k\dagger} X_M^k = \sum_{i=0}^{M-1} X_1^{(k+i)\dagger} X_1^{k+i}$$

therefore, $$\|X_M^{k\dagger} X_M^k\| \le \sum_{i=0}^{M-1} \|X_1^{(k+i)\dagger} X_1^{k+i}\|$$

and consequently, $$SNR_e \le \frac{\|\vec{H}\|}{N_0} \sum_{i=0}^{M-1} \|X_1^{(k+i)\dagger} X_1^{k+i}\|$$

This says that the larger M is the higher the signal to noise ration has the potential to be. So, on the one hand we would like to take M as large as possible. But as mentioned earlier, the larger M is, the approximation of $\Psi_0$ to an identity matrix falls apart quicker. Since all elements of the matrix $X_M^k$ are known before hand, specifically in the cases where the known pattern word is forced by standards, one can spend however long it takes and try various values of M to find the best choice, and then hard code it in the receiver. The choice of l, however, is usually forced upon us by the nature of the channel, and what is besides the frequency offset that we are going to estimate by this method. For example, in the case of the IS-136 standard, if we only want to estimate the frequency offset, since we do not have to worry about delay spreads of more than one symbol long, i.e., 41 μs, we have chosen l to be 2, so we estimate the channel we only two taps of one symbol apart, and we got satisfactory results, as will be shown later in this paper. If on the other hand we are interested in using the channel estimate as an initial estimate in an adaptive equalizer with j taps each T/k apart, then l should equal j, and the elements of $\vec{H}$ should be T/k apart.

Each system has its own peculiarities, and one can carefully take this fact into account for his/her own advantage in the design process. For example, in the following section we will consider a special case in the mobile environment.

2.1 A Special Case in the Mobile Environment

Consider a mobile environment in which delay spread is no longer than one symbol time long as an example. The IS-136 environment is one example that falls under this category. We are trying to estimate the frequency offset present in a burst. Since in a mobile environment at most we only get two instances of a burst, then in order to minimize the processing requirements, which is a very important issue, we take l to be 2 (because there are no more than two instances of the burst), with the two elements of $\vec{H}$ one symbol apart (because the delay spread is not more than one symbol long). In this case a closer examination of the 2×2 matrix $X_M^{k\dagger} X_M^k$ reveals that $$X_M^{k\dagger} X_M^k = \begin{bmatrix} \sum_{i=k}^{k+M-1} |x_i|^2 & \sum_{i=k}^{k+M-1} x_i^* x_{i-1} \\ \sum_{i=k}^{k+M-1} x_i x_i^* - 1 & \sum_{i=k-1}^{k+M-2} |x_i|^2 \end{bmatrix} \quad (10)$$

Now, since the $x_i$'s are one symbol apart and in mobile environment we have a PSK-like schemes, then each of the diagonal terms adds up to M times the energy of a symbol, and are equal. In the off diagonal terms (note that one is the complex conjugate of the other), each term is the phase difference in going from one symbol to the next, and there are M of them. If the off diagonal terms add up to zero, then we have diagonalized the $X_M^{k\dagger} X_M^k$ matrix and the process of estimation will be much simpler, and more importantly, without any noise enhancement. In this situation we have $X_M^{k\dagger} X_M^k = M\rho I$, where p is the symbol energy and I is the identity matrix. Note that in this case the extra linear processing of the received vector by $(X_M^{k\dagger} X_M^k)^{-1}$ is not necessary, since it just changes the gain and does not increase any information value for estimating $\vec{H}$. So the estimation process simply reduces to $\hat{H} = X_M^{k\dagger} \vec{R} = M\rho \vec{H} + X_M^{k\dagger} \vec{W}$, simply a matched filter (matched to the transmitted symbols not the channel), and the signal to noise ratio is $$\frac{\|\vec{H}\|}{N_0},$$

which is the best one can achieve.

If we expand the top off diagonal term (the bottom one is simply the complex conjugate of this) in (10) we get $$\sum_{i=k}^{k+M-1} x_i^* x_{i-l} = \sum_{i=1}^{M} \cos(\theta_i - \theta_{i-1}) + j\sum_{i=1}^{M} \sin(\theta_i - \theta_{i-1}) \quad (11)$$

where $\theta_i$ is the phase of the $i^{th}$ symbol, and M>1. The goal is to make the right hand side equal zero. From the relationship above we see that if we take $$\theta_i = i\frac{2\pi}{M}, \quad i = 0, 1, \ldots, M,$$

then we get the off diagonal terms to be zero.

But, this in general requires some constellation symbols that may not be standard. Even though during the SYNC pattern generation we can choose whatever points we like, this may be prohibitive specially in cases that we have to adhere to a standard. For example, in case of M=3, we need transmitted symbols that are 120 degrees apart. Even if we change our transmission constellation during the SYNC-word, the implementation will become more involved. The case of M=2 and M=4, however, is more practical. For instance when M=4, we need symbols that are 0, 90, 180, and 270 degrees apart, which is a typical QPSK constellation. Recalling our previous argument, in practice we do not want M to be large due to the approximation of $\Psi_0$ to an identity matrix.

In case M is 2 or even, there is an easy way to achieve the diagonalization, as described in the following section.

2.2 Diagonalization Algorithm When M is Even

If M is even, we can take $\theta_{i+1} = \theta_{i-1}$, in other words, take every other symbol to be the same, known as a dotting pattern in practice. This will result in the second summation on the right hand side of (11) to be zero, and the first sum to be Mcos ($\theta_1 - \theta_0$). If we take $\theta_1 - \theta_0 = \pm \pi/2$ then the first sum will be zero too, and the off diagonal term will be zero.

This simply means

Take any two symbols from the constellation that are 90 degrees apart.

Transmit every other one ending on the symbol you started with.

In most practical cases this can be easily achieved, such as in QPSK and 8-PSK. But unfortunately, this is not useful for π/4 shifted-QPSK, as in IS-136, since in this scheme consecutive symbols must be an odd multiple of 45 degrees apart.

If M=2, a closer look at (11) reveals that the off diagonal terms can be made zero if $\theta_2-\theta_1=(\theta_1-\theta_0+\pi)$ mod $(2\pi)$.

So the algorithm simply is

Choose a transition from one arbitrary symbol to a second arbitrary symbol, within the bounds of the modulation scheme.

Find the phase change in this transition.

Take the third symbol to be 180 degrees plus the previous phase change module $2\pi$ away from the second symbol.

This is very useful especially in the case of IS-136, as the aforementioned schemes for diagonalization would have failed IS-136. But in this scheme, if, for instance, we take the first phase change, going from one symbol to the next, to be 45 to −45 degrees, the next phase change needs to be −135 or 135 degrees, respectively, to achieve the diagonalization goal. Fortunately this happens in two places in SYNC1 pattern of IS-136, namely, at offsets 1 and 8. The SYNC patterns in IS-136 are given as phase changes, so the initial symbol is arbitrary, and are shown below for easier reference.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., a matching filter, etc., the functions of any one or more of those building blocks can be carried out using one or more appropriate programmed processors, e.g., a digital signal processor. Similarly, although shown separately as a cascaded matching filter and sidelobe suppression filter, these filters can be combined into one filter. Also, the inventive concept is not limited to the applications of TIA IS-136.

What is claimed:

1. A method for use in a receiver for estimating a frequency offset, the method comprising the steps of:

receiving a signal representing information in a time-division-multiplexed-access format that includes data representing a synchronization word comprising x symbols;

forming a plurality of m-tap estimates of different portions of the received synchronization word, each portion comprising at least k symbols, where m≧2 and k<x; and determining the frequency offset estimate as a function of phase differences between the plurality of m-tap estimates.

2. The method of claim 1 wherein the forming step match filters each of the k-symbol portions of the received synchronization word with a corresponding k-symbol portion of a pre-stored version of the synchronization word for providing the plurality of m-tap estimates.

3. The method of claim 2 wherein the match filtering correlates each k-symbol portion of the received version with a corresponding k-symbol portion of the pre-stored version for providing the plurality of m-tap estimates.

4. The method of claim 1 wherein the determining step includes the steps of:

selecting j of the plurality of m-tap estimates; and determining the frequency offset estimate as a function of phase differences between the j-selected m-tap estimates.

5. The method of claim 4 wherein the selecting step selects the m-tap estimates having the j largest magnitudes.

6. The method of claim 5 wherein the determining step includes the step of weighting the phase differences between the j-selected m-tap estimates as a function of the magnitudes of the j-selected m-tap estimates as a precondition to determining the frequency offset estimate.

7. The method of claim 1 wherein the forming step includes the steps of:

match filtering each portion to provide an interim plurality of m-tap estimates; and filtering each of the interim plurality of m-tap estimates to reduce sidelobes to provide the plurality of m-tap estimates.

8. A method for use in a receiver, the method comprising the steps of:

forming a plurality of m-tap estimates of a received signal, where m≧2; and determining a frequency offset estimate, for use in recovering information from the received signal, as a function of phase differences between the plurality of m-tap estimates wherein the received signal includes a received version of a predefined pattern of symbols comprising j symbols, and the forming step match filters n portions of the received version for providing the plurality of m-tap estimates, where n≦j.

9. The method of claim 8 wherein each portion comprises k symbols of the predefined pattern, where k<j.

10. The method of claim 9 wherein the match filtering correlates each k-symbol portion of the received version with a corresponding k-symbol portion of the predefined version for providing the plurality of m-tap estimates.

11. The method of claim 10 wherein the received signal is representative of a time-division-multiplexing-access signal and the predefined pattern of symbols is a synchronization word.

12. A method for use in a receiver, the method comprising the steps of:

forming a plurality of m-tap estimates of a received signal, where m≧2; and determining a frequency offset estimate, for use in recovering information from the received signal, as a function of phase differences between the plurality of m-tap estimates wherein the determining step includes the steps of:

selecting j of the plurality of m-tap estimates; and determining the frequency offset estimate as a function of phase differences between the j-selected m-tap estimates.

13. The method of claim 12 wherein the selecting step selects the m-tap estimates having the largest magnitudes.

14. The method of claim 12 wherein the determining step includes the step of weighting the phase differences between the j-selected m-tap estimates as a function of the magnitudes of the j-selected m-tap estimates as a precondition to determining the frequency offset estimate.

15. A method for use in a receiver, the method comprising the steps of:

forming a plurality of m-tap estimates of a received signal, where m≧2; and determining a frequency offset estimate, for use in recovering information from the received signal, as a function of phase differences between the plurality of m-tap estimates wherein the received signal includes a received version of a predefined pattern of symbols comprising j symbols, and wherein the forming step includes the steps of:

match filtering n portions of the received version for providing an interim plurality of m-tap estimates, where $n \leq j$; and filtering the interim plurality of m-tap estimates to reduce sidelobes to provide the plurality of m-tap estimates.

16. The method of claim 15 wherein the received signal is representative of a time-division-multiplexing-access signal and the predefined pattern of symbols is a synchronization word.

17. Apparatus for estimating a frequency offset in a received signal, the received signal representing information in a time-division-multiplexed-access format that includes data representing a synchronization word comprising x symbols;

N banks of filters for filtering N different portions of the received synchronization signal to provide N m-tap estimates, where $m \geq 2$; and a frequency offset estimator responsive to the N m-tap estimates for generating the estimated frequency offset.

18. The apparatus of claim 17 wherein each portion comprises at least k symbols of the synchronization word, where k<x.

19. The apparatus of claim 18 wherein each filter bank correlates at least one k-symbol portion of the received synchronization word with a corresponding k-symbol portion of a pre-stored synchronization word for providing its m-tap estimate.

20. The apparatus of claim 18 wherein the frequency offset estimator comprises:

a selector for selecting j of the N m-tap estimates; and means for determining the frequency offset estimate as a function of phase differences between the j-selected m-tap estimates.

21. The apparatus of claim 20 wherein the selector selects the m-tap estimates having the j largest magnitudes.

22. The apparatus of claim 20 wherein the means for determining further includes a means for weighting the phase differences between the j-selected m-tap estimates as a function of the magnitudes of the j-selected m-tap estimates in order to determine the frequency offset estimate.

23. The apparatus of claim 17 wherein each filter bank further comprises:

a match filter for matching its portion of the synchronization word with a corresponding pre-stored portion of the synchronization work for providing an interim m-tap estimate; and a sidelobe reduction filter for reducing sidelobes present in the interim m-tap estimate to provide the corresponding m-tap estimate of the filter bank.

24. Apparatus for estimating a frequency offset in a received signal, the apparatus comprising:

a plurality of filters, each filter forming an m-tap estimate of different portion of the received signal: where $m \geq 2$; and a frequency offset estimator responsive to the plurality of m-tap estimates for generating the estimated frequency off set wherein the received signal includes a received version of a predefined pattern of symbols comprising j symbols, and each filter match filter n portions of the received version for providing the plurality of m-tap estimates, where $n \leq j$.

25. The apparatus of claim 24 wherein each portion comprises k symbols of the predefined pattern, where k<j.

26. The apparatus of claim 25 wherein the match filtering correlates each k-symbol portion of the received version with a corresponding k-symbol portion of the predefined version for providing the plurality of m-tap estimates.

27. The apparatus of claim 26 wherein the received signal is representative of a time-division-multiplexing-access signal and the predefined pattern of symbols is a synchronization word.

28. Apparatus for estimating a frequency offset in a received signal, the apparatus comprising:

a plurality of filters, each filter forming an m-tap estimate of different portion of the received signal: where $m \geq 2$; and a frequency offset estimator responsive to the plurality of m-tap estimates for generating the estimated frequency off set wherein the frequency offset estimator comprises: a selector for selecting j of plurality of m-tap estimates; and means for determining the frequency offset estimate as a function of phase differences between the j-selected m tap estimates.

29. The apparatus of claim 28 wherein the selector selects the m-tap estimates having the j largest magnitudes.

30. The apparatus of claim 28 wherein the means for determining further includes a means for weighting the phase differences between the j-selected m-tap estimates as a function of the magnitudes of the j-selected m-tap estimates as a precondition to determining the frequency offset estimate.

31. Apparatus for estimating a frequency offset in a received signal, the apparatus comprising:

a plurality of filters, each filter forming an m-tap estimate of different portion of the received signal: where $m \geq 2$; and a frequency offset estimator responsive to the plurality of m-tap estimates for generating the estimated frequency off set wherein the received signal includes a received version of a predefined pattern of symbols comprising j symbols, and each filter further comprising:

a match filter for matching a portion of the received version for providing an interim m-tap estimate; and a sidelobe reduction filter for reducing sidelobes present in each interim m-tap estimate to provide the corresponding m-tap estimate of the plurality of m-tap.

32. The apparatus of claim 31 wherein the received signal is representative of a time-division-multiplexing-access signal and the predefined pattern of symbols is a synchronization word.

* * * * *